United States Patent [19]
Seidel

[11] 3,849,198
[45] Nov. 19, 1974

[54] IRON ELECTRODE PASTE FOR ALKALINE BATTERY PLATES

[75] Inventor: Joseph Seidel, Pittsburgh, Pa.

[73] Assignee: Westinghouse Electric Corporation, Pittsburgh, Pa.

[22] Filed: July 31, 1973

[21] Appl. No.: 384,320

[52] U.S. Cl. .............................................. 136/25
[51] Int. Cl. ....................................... H01m 43/04
[58] Field of Search ................ 136/25, 120; 106/70; 252/62.3; 117/100, 234

[56] References Cited
UNITED STATES PATENTS

| | | | |
|---|---|---|---|
| 1,761,740 | 6/1930 | Nordlander | 106/70 X |
| 2,871,281 | 1/1959 | Moulton et al. | 136/25 |
| 3,066,178 | 11/1962 | Winkler | 136/25 X |
| 3,507,696 | 4/1970 | Jackovitz et al. | 136/25 |
| 3,650,835 | 3/1972 | Jackovitz et al. | 136/25 |
| 3,679,482 | 7/1972 | Hardman | 136/25 |

*Primary Examiner*—Winston A. Douglas
*Assistant Examiner*—C. F. Lefevour
*Attorney, Agent, or Firm*—D. P. Cillo

[57] ABSTRACT

A battery negative electrode plate is made by loading a metallic electrode plaque with an active material paste having a solid component comprising about 70–100 weight percent iron particles over about 5 microns diameter; about 0–30 weight percent iron particles up to about 1 micron diameter; about 0–1 weight percent of a water-soluble dispersion agent and about 0.02–0.5 weight percent of a water-soluble cellulosic thickener. The paste has a solids to water ratio of between about 5:1 to 2:1 and can be activated with effective amounts of sulfur, selenium, or tellurium containing additives.

7 Claims, 2 Drawing Figures

PATENTED NOV 19 1974　　　　　　　　　　3,849,198

IRON ELECTRODE PASTE FOR ALKALINE BATTERY PLATES

BACKGROUND OF THE INVENTION

This invention relates to improved active material battery pastes, which combine water-soluble dispersing agents, and water-soluble cellulosic thickeners with iron oxides and/or iron oxide hydrates. It is generally known that a negative iron battery electrode plate, in an alkali electrolyte, functions because of oxidation of metallic iron to hydroxides or oxides of iron or both. The iron battery electrode plate is generally a finely divided iron oxide powder, deposited or impregnated in a supporting plaque and compacted to a desired density. The iron powder can include ferrous oxide (FeO), ferric oxide ($Fe_2O_3$), ferroso-ferric oxide ($FeO.Fe_2O_3$ or $Fe_3O_4$), hydrated ferric oxide ($Fe_2O_3.H_2O$) and mixtures thereof. Suitable sources of finely divided iron oxide powder are synthetic magnetites, which generally contain $Fe_2O_3$ and FeO.

When pure iron oxide powder is used as an electrode active material in an alkali electrolyte, a battery has limited utilization due to the rapid formation of a passivating film on the iron powder surface. To promote the charging of the compacted powder, as well as to facilitate the discharging of the electrode plate, a reaction promoting additive for the electrode active material is needed. Such an additive should have the ability to activate the entire substance, though present in relatively small amounts. The properties of such an additive should approach those of a transfer catalyst, causing the breakdown of any protective film and thus keeping the iron active material surface in an active state.

The addition of sulfur or sulfur compounds such as FeS, as reaction promoting additives to iron oxide powder is known in the art. Such materials have generally been incorporated throughout the iron oxide powder in small amounts as an intimate mixture. Water is then added to the mixture to form a slurry having a high water to solids ratio. In subsequent aqueous slurry impregnation of supporting plaques, the mixture of iron oxide powder and additive easily separate.

Jackovitz, in U.S. Pat. No. 3,507,696, provided an improved iron battery electrode, by fuse coating elemental sulfur onto iron oxide active material particles. This fuse coated iron oxide active material provided excellent Amp hr/gram output with finely divided iron oxides, such as found in synthetic magnetite. The fine fuse coated oxides, however, while not subject to separation during application, and while having an excellent capacity of about 0.5 Amp hr/gram, were adhesive, and were not as homogeneous as could be desired. This complicated paste application to plaques as they required a tedious, highly aqueous slurry vacuum impregnation technique for loading.

As can be seen, there is a need for an improved iron electrode active material paste, which is inexpensive, homogeneous, and has a high loading density yet good electrolyte permeability and mechanical properties, while preserving high output and allowing continuous active material loading.

SUMMARY OF THE INVENTION

This invention solves the above problems by providing an optimum oxide active material paste, having a very low water to solids ratio and containing critical amounts of water-soluble dispersing agent and organic water-soluble cellulosic thickener. This active material battery paste comprises an aqueous mixture of a solid component comprising between about 70–100 weight percent large iron oxide particles of about 5 to 85 micron average diameter; about 0–30 weight percent very small iron oxide particles of about 0.1 to 1.0 micron average diameter; about 0–1 weight percent of water-soluble dispersing agent and about 0.02–0.5 weight percent of an organic water-soluble cellulosic thickener. About 100 parts of this solid component is mixed with 20–50 parts water, to provide a homogeneous paste that has a low yield point, allowing higher active battery material loading in a given volume of electrode plaque voids than prior art materials, and which, because of its high solids content and thixotropic properties, can be used in a continuous loading process.

This particular combination of iron oxide particles, critical amounts of dispersant, plasticizing thickener, and low water to solids ratio, provides an iron oxide active material paste that is inexpensive, has a high final loading density, excellent electrolyte permeability, provides excellent homogeneity and pressure pasting properties, and that does not harm the output of the plate.

BRIEF DESCRIPTION OF THE DRAWINGS

For a better understanding of the invention reference may be made to the preferred embodiments, exemplary of the invention, shown in the accompanying drawings, in which.

DESCRIPTION OF THE PREFERRED EMBODIMENT

Figure 1:
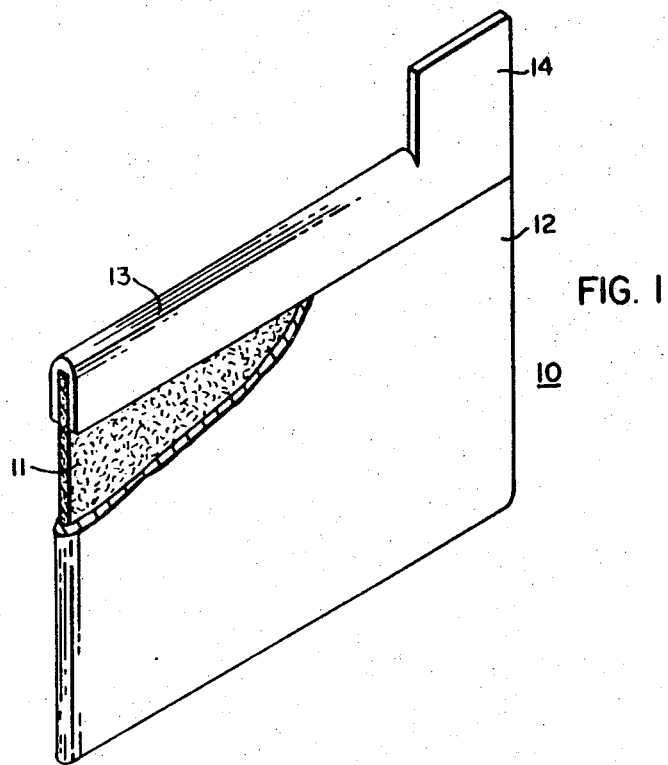
FIG. 1 shows a perspective view of one embodiment of a storage battery plate loaded with the active material of this invention.

A battery plate is shown at 10 in FIG. 1 and includes a supporting metallic electrode plaque 11, a body of pasted or injection loaded active material paste 12, and a current collecting strap, one embodiment of which is shown as 13, having a lead tab 14. The battery plate 10 is intended for use in a battery with a suitable alkali electrolyte, such as, for example, 25 to 40 weight percent potassium hydroxide.

The supporting plaque of FIG. 1 must be of a highly porous construction. This may be provided by a mesh or grid of fibrous strands, such as nickel or nickel plated iron or steel, which are disposed either in a woven or in an unwoven texture of about 75–96 percent porosity. For example, the plaque structure 11 may be composed of a mesh of fine nickel fibers which are pressed or preferably heat bonded together using diffusion bonding techniques, where there is an interdiffusion of atoms across the contacting fiber interfaces, without fiber melting which would form melt globules reducing plaque active material loading volume.

Referring again to FIG. 1, the body of active material paste 12 is disposed on and within the interstices of the supporting plaque. The active material can be composed of a mixture of different size particles, which may be applied to the plaque by a pressure pasting or injection loading process. The loaded plaque is compressed to the desired thickness and subsequently dried.

The body of active battery material includes at least one oxide of iron or iron oxide hydrate. The iron particle component can include ferrous oxide ($FeO$), ferric oxide ($Fe_2O_3$), ferroso-ferric oxide ($FeO \cdot Fe_2O_3$ or $Fe_3O_4$), hydrated ferric oxide ($Fe_2O_3 \cdot H_2O$) and mixtures thereof. The iron particle active material of this invention must comprise a mixture of between about 70–100 weight percent coarse iron particles having an average particle size between about 5 to about 85 microns. A suitable iron material satisfying the above requirement is naturally occurring magnetite, which is mined, crushed, milled, magnetically separated and then screened. This material contains about 94 weight percent $Fe_3O_4$, 5 weight percent $Fe_2O_3$, and 1 weight percent impurities. It has a density of 5.0 g/cm$^3$, a tapped bulk density of 2.9 g/cm$^3$ and a surface area of about 0.2 sq. meters/g.

The other iron component, comprising about 0–30 weight percent of the mixture is fine iron particles having an average particle size between about 0.1 to about 1.0 micron. A suitable iron material satisfying the above requirement is synthetic magnetite, which can be prepared by precipitating ferrous hydroxide from an iron salt solution and then oxidizing with air under rigidly controlled conditions. This material contains about 77 weight percent $Fe_2O_3$, 22 weight percent $FeO$, and 1 weight percent impurities. It has a density of 4.95 g/cm$^3$, a tapped bulk density of 0.71 g/cm and a surface area of about 6.7 sq. meters/g. The use of large amounts of these fine particles would require use of thick plaques. Best results, in terms of cost, loading and output result when a combination of coarse and fine sized iron oxides are used. Preferably at least about 5 weight percent fine particles are used. Use of over 30 weight percent fine particles, requires thick loading plaques, due to an increase of the water requirement, makes continuous loading difficult, in that a dewatering and second compressing step are required, and produces an expensive paste having no advantages in terms of electrical output.

The purpose of sulfur, selenium or tellurium containing additives is to prevent passivation of the iron particles during discharge, and to create a favorable condition for an effective acceptance of charge. The reaction promoting additive apparently promotes a greater degree of disorder in the crystal structure and thereby enhances electrical conductivity of the material. When an electrode is prepared, it is in the discharged condition. It must then be charged by passing a current to convert the iron oxide and iron oxide hydrates to iron metal. The additive apparently catalyzes the reduction of the iron oxide to metallic iron by inhibiting the formation of hydrogen molecules on the oxide surface. If a reaction promoting additive is not present, nearly all of the electrical energy is transformed into hydrogen molecule formation.

The preferred and most practical reaction promoting additive to the paste is sulfur, of about 99 percent purity, in the form of elementary flowers of sulfur, colloidal sulfur, or as pure sulfur particles obtained by evaporation of a solution containing molecular sulfur. The sulfur additive can be dry mixed with the iron component particles or mechanically fused to the iron particles by means of heating the sulfur and iron particles in a container at about 100°C. to about 150°C.

The reaction promoting additive when mixed in the paste or used as a fused coating on the iron particles, may be used in the range of up to about 5 weight percent of the solid paste component. The coarse magnetite needs less additive to effectively activate it. A paste, containing 100 percent coarse natural magnetite will require only about 1 wt. percent additive, whereas a blend of 70 percent coarse natural magnetite and 30 percent fine magnetite will require about 3 or 4 weight percent additive.

The additive need not however be added to the paste or fuse coated on the iron particles, since activation can also be accomplished by a post pasting operation. In this method of activation, a paste not containing additive is loaded into the plaque, which can then be dipped into or sprayed with a liquid containing sulfur or sulfur compounds in amounts effective to activate the loaded plate. High purity selenium and tellurium can be similarly used as the additive in this invention. Selenium is available as either pellets, stick or shot at 99.9 percent purity. Tellurium is usually marketed with a purity of over 99.7 percent with most of the impurity as selenium. It is to be understood that compounds of all these reaction promoting materials can also be used.

The new battery paste system of this invention has a low water to solids ratio, is thixotropic and has a low yield point. The low water ratio offers high active material loading in a given volume of voids in the electrode matrix. The thixotropic property provides some resistance to flow, so that the paste can be mechanically injected into the fibrous electrode plaque matrix. The yield point is the minimum force necessary to start the flow of the paste, and a low yield point allows for injection of the paste without deformation of the electrode matrix. Other properties of this paste which are important to a controlled manufacturing process are long shelf life and stability during application.

It is imperative that the water to solids ratio be low and consistent for controlled loading. In this invention, the consistency is controlled by the water content and by a judicious addition of a water-soluble dispersant and organic water-soluble cellulosic thickener or suspending agent, the combination of which helps to allow fine milling and provides homogeneous pastes after mixing and grinding of the ingredients. The dispersant is effective to deflocculate the fine iron oxide particles, so that less water is required for a paste containing a large amount of fine iron oxides. The dispersant also enhances the homogeneity of the multiphase system.

The cellulosic polymer, which acts as a water thickener, counters in part the effect of the dispersant but is compatible with it and is extremely effective in stabilizing the pastes containing coarser oxide particles. The cellulosic thickener provides for excellant water to solids homogeneity. It also increases the vapor pressure of the paste so as to appreciably reduce the evaporation of the water, which may be particularly important when loading plaques with exposed rolls. The cellulosic thickener also lubricates the solids, particularly the coarser solids, which is important in roll pressing the loaded plaque so that the plaque fibers do not rip. The dispersant and cellulosic thickener used in this invention are compatible with each other and with the battery system and do not contain any elements harmful to battery plate performance.

One type dispersing agent that is useful is a sodium lignosulfonate. The basic lignin monomer unit is a lignosulfonate which is an anionic polyelectrolyte with a molecular weight between about 1,000 and 20,000. An example would be a polymeric lignosulfonic acid. These dispersants are manufactured from crude lignosulfonate by processes which increase lignosulfonate purity and surface activity. The organic structure of lignosulfonate compounds has not been completely determined, but it is known that the basic lignin monomer unit is a substituted phenyl propane. A section of the polymeric lignosulfonic acid could have the following structure:

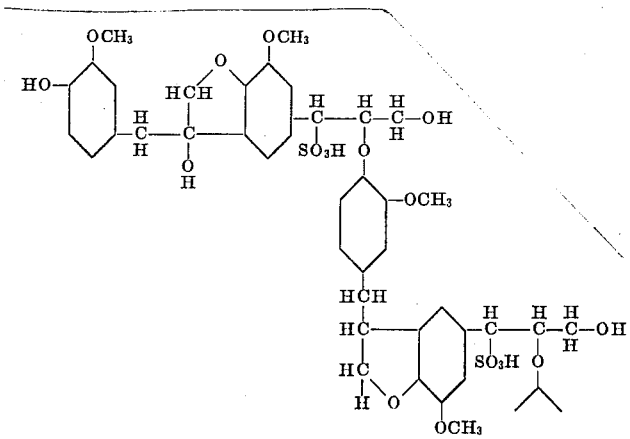

A typical analysis of the sodium lignosulfonate dispersing agent useful in this invention would include sulfur from about 2.5 to 9 weight percent, $OCH_3$ from about 6 to 14 weight percent and $Na_2O$, the sodium component, from about 5 to 30 weight percent. This type dispersing agent is completely soluble in water and has a surface tension in 1 percent solution of between about 49 to 53 dynes/cm. This material is the preferred dispersing agent in this invention.

Other suitable water-soluble dispersing agents include ammonium and sodium salts of polyacrylic polyelectrolytes or ammonium and sodium salts of polymethacrylic polyelectrolytes, such as, for example, the ammonium salt of a copolymer of methyl methacrylate and methacrylic acid and the sodium salt of a copolymer of methyl methacrylate and methacrylic acid; and sodium salts of polymerized alkylaryl sulfonic acids, such as, for example, sodium salts of polymerized alkyl naphthlene sulfonic acids. These dispersing agents are anionic and soluble in water and can include carboxylate ions, in which the carboxyl group is attached directly to hydrophobic portions of the polymer or through an intermediate linkage. The dispersants derived from sulfonic acids can contain as hydrophobic groups, aliphatic and aromatic components which often contain substituents of varying polarity such as hydroxyl, ether and ester groups.

The action of the dispersing agents used in this invention is electro-kinetic in nature. As they are adsorbed by the solids in suspension they effect a negative charge, causing the solids to repel one another. The dispersing agent is effective to prevent the formation of agglomerates and thus retards solids settling. The dispersing agent is also effective to decrease the viscosity of a system while maintaining the same solids content, since the repulsive electrical charge effect inhibits solid to solid contact, permitting freer solid movement in the water media. No dispersing agent is needed when the paste of this invention contains all coarse iron particles, but preferably the paste will contain about 0.02–0.75 weight percent dispersant. Over about 1 weight percent dispersant may harm cell life.

One type organic, water-soluble cellulosic thickener that is useful is a non-ionic hydroxyethyl ether cellulose, made by treating cellulose with sodium hydroxide and reacting with ethylene oxide. An idealized structure is shown below:

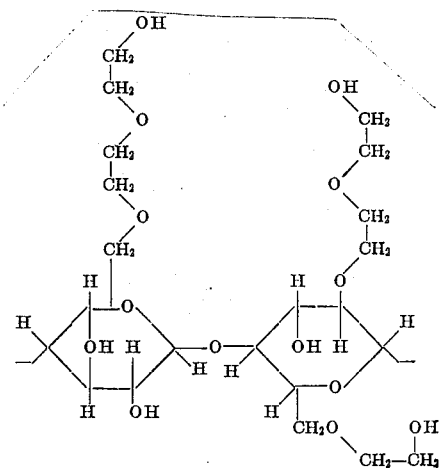

This type cellulose ether thickener is very soluble in water, has a surface tension in 0.1 percent solution of between about 66 to 70 dynes/cm and its solutions are unaffected by cations. Another suitable non-ionic cellulose ether of this type is hydroxy propyl ether cellulose.

Other suitable organic water-soluble thickeners include cellulose gums such as sodium carboxymethyl cellulose. An idealized structure is shown below:

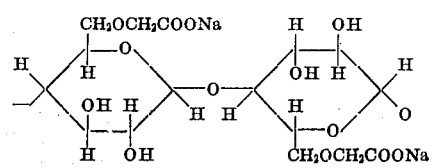

These cellulose ether thickeners are anionic polyelectrolytes and very soluble in water. The term polyelectrolyte is used to mean high molecular weight polymers producing large chain type ions in solution, that can carry positive or negative groups along the polymer chain.

The use of these dispersants and thickeners provides a homogeneous paste which has a low water content for the high active material loading, long shelf lifes and stable rheological properties. The lower water content is obtained by the judicious combination of fine and coarse magnetites and by the use of critical amounts of dispersant and thickener. The homogeneity of the paste of this invention offers multiphase formulations with no phase separation risk. As an alternative to additive fuse coated magnetites, free sulfur and free magnetites can be incorporated with no risk of phase separation. Other constituents, such as natural graphite powder can be added to the basic formulation, which can be prepared within the following ranges:

| | |
|---|---|
| iron particles over about 5 microns: | about 70–100 parts by wt. |
| iron particles up to about 1 micron: | about 0–30 parts by wt. |
| additive (S, Se, Te or their compounds): | about 0–5 parts by wt. |
| water-soluble dispersing agent: | about 0–1 parts by wt. |
| water-soluble cellulosic thickener: | about 0.02–0.5 parts by wt. |

About 20–50 parts water is added to about 100 parts of this solid component, to provide a solids:water weight ratio of between about 5:1 to 2:1. The specific gravity of the paste will vary from about 2 to 3 grams/cu cm. The battery paste should be homogeneously ground or milled, so that any conglomerates present are no larger than about 74 microns diameter, i.e., the paste mixture should pass through a No. 200 mesh U.S. Sieve Series (74 micron) Tyler Standard screen.

Figure 2:
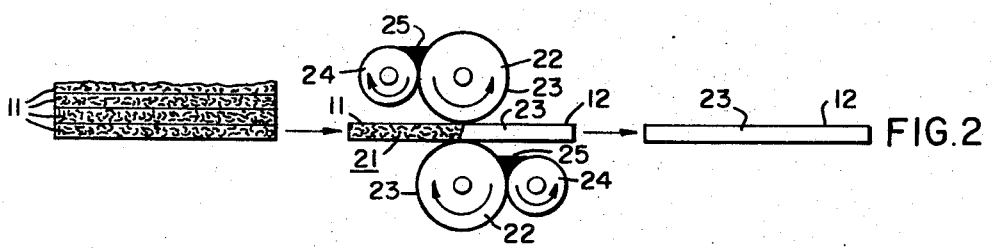
FIG. 2 shows one embodiment of the continuous pressure injection technique that can be used to load the plaques with the active material paste of this invention.

Referring now to FIG. 2, there is shown one embodiment of the pressure injection technique which can be used to load electrode plaques, in a continuous fashion individually from a stack of plaques as shown, or from a rolled strip. Metallic electrode plaque 21 is passed between rotating application rollers 22, which are fed a thin layer of battery electrode paste 23 from feed doctor rollers 24, with associated electrode paste reservoirs 25 located between the two rolls. The paste of this invention is designed primarily for an inexpensive, continuous, mass production pasting operation, by continuous roller pressure application techniques, such as shown in FIG. 2.

EXAMPLE 1

An electrode paste was prepared by dissolving 0.1 gram of an ionic, water-soluble sodium lignosulfonate compound dispersing agent, having a molecular weight between 1,000 and 20,000 and an analysis, on a moisture free basis of, 8.3 weight percent sulfur, 7.7 weight percent $OCH_3$ and 13.2 weight percent $Na_2O$ (sold commercially by American Can Co. under the Tradename Marasperse N22 Dispersant), in 28 grams deionized water, and mixing into this solution, 7.5 grams of sulfur fuse coated synthetic magnetite. The magnetite contained about 77 weight percent $Fe_2O_3$ and 22 weight percent $FeO$, and had an average particle size between about 0.2–0.8 microns (sold commercially by Cities Service Co. under the Tradename Mapico Black). Next, 0.2 grams of a non-ionic, water-soluble, hydroxyethyl ether of cellulose thickener (sold commercially by Hercules Inc. under the Tradename Natrosol 250HHR) was dry mixed with 92.5 grams of sulfur fuse coated natural mannetite. The natural magnetite contained about 94 weight percent $Fe_3O_4$ and 5 weight percent $Fe_2O_3$ and had an average particle size of about 10 microns (sold commercially under the Tradename Meramec M–25). The total iron active material contained about 1.5 weight percent elemental sulfur based on solid component weight.

The sulfurized Meramec mixture was then blended with the sulfurized Mapico Black mixture to form a substantially coarse active material paste which was allowed to age for about 6 to 16 hours. The aged paste was millable i.e., not too agglomerated, and was then passed twice through a 3-roll mill mixer with a 0.002 inch gap. The final mill mixing operation produced a very homogeneous paste, with about a 3.6:1 solids to water ratio and a specific gravity of about 2.7 gr./cu. cm., with no apparent agglomerates and would pass through a 270 mesh (about 0.002 inch or 53 micron screen). The paste was thixotropic, had a low yield point and a shelf life of over 2 weeks.

There was no separation of the mixture components and the paste was easily pressure roller pasted, as shown in FIG. 2 of the drawings, into diffusion heat bonded expansible nickel fiber plaques. These plaques were initially about 92 percent porous, having a surface area of 92 sq. inches and an initial thickness of about 0.065 in. This pressure injection technique required two passes through 4.5 inch diameter rubber application rollers having a 1/16 inch layer of paste on their surface. The application rolls exerted little pressure on the plaques. The plaque was then roll pressed to about 0.035 in. and provided a loading of about 79 grams/plaque or about 1.8 grams/cu. cm. of plaque volume.

Electrochemical test data was obtained for these plates, in a half cell system containing two nickel dummy electrode plates of about 95 sq. in. in 25 weight percent KOH electrolyte. The charge rate was 105 Amp-hours at 42 amps, and the discharge rate was 16.3 Amps to 0.4 volts vs. a Hg/HgO reference electrode. Performance was measured and indicated excellent capacity values of 0.64 Amp-hr/gram active material after 6 cycles and 0.64 Amp-hr/gram active material after 12 cycles. The theoretical value is 0.89 Amp-hr/gram for this type activated iron oxide battery material. The active electrode paste of this invention can be used to great advantage in the negative plate for batteries in numerous battery combinations, as for example, a nickel-iron battery.

EXAMPLE 2

Similarly to Example 1, an electrode paste was prepared containing 0.3 grams Marasperse N22 Dispersant, 30 grams sulfur fuse coated Mapico Black, 70 grams sulfur fuse coated Meramec coarse natural magnetite, 0.02 Natrosol 250HHR thickener and 34 grams deionized water. The total iron active material contained about 3 weight percent elemental sulfur based on solid component weight. The paste was blended, aged and milled as in Example 1 and produced a relatively homogeneous paste with about a 2.9:1 solids to water ratio and a specific gravity of about 2.47 gr/cu. cm. The paste was relatively thixotropic and had a low yield point. There was no separation of the mixture components and the paste was easily pressure roller pasted into similar type plaques using the method and equipment described in Example 1, to provide a loading of about 90 grams/plaque or about 2.0 grams/cu. cm. of plaque volume.

Electrochemical test data was obtained for these plates in the battery half cell, at the same charge and discharge rates, as described in Example 1. Performance indicated excellent capacity values of 0.65 Amp-hr/gram active material after 6 cycles, 0.62 Amp-hr/gram active material after 12 cycles and 0.58 Amp-hr/gram active material after 15 cycles.

EXAMPLE 3

Similarly to Example 1, an electrode paste was prepared containing 0.14 grams Marasperse N22 Dispersant, 7.5 grams sulfur fuse coated Mapico Black, 92.5 grams sulfur fuse coated Meramec coarse natural magnetite, 0.16 Natrosol 250HHR thickener and 23 grams deionized water. The total iron active material contained about 1.5 weight percent elemental sulfur based on solid component weight. The paste was blended, aged, and milled as in Example 1, and produced a stiff but yet very homogeneous paste with about a 4.3:1 solids to water ratio and a specific gravity of about 2.8 gram/cu. cm. The paste was relatively thixothropic and still had a low yield point. There was no separation of the mixture components. The paste was seen as an excellent high solids electrode paste, and was easily pressure roller pasted into plaques, using the method and equipment described in Example 1. It was found to be useful for the stiffer nickel plated steel wool electrodes.

EXAMPLE 4

Similarly to Example 1, an electrode paste was prepared containing 0.12 grams Marasperse N22 Dispersant, 7.5 grams Mapico Black, 92.5 grams Meramec coarse natural magnetite, 1.50 grams Flowers of Sulfur, 5.0 grams natural Graphite, 0.18 Natrosol 250HHR thickener and 28.5 grams deionized water. The active material contained about 1.4 weight percent elemental sulfur based on solid component weight. The paste was blended, aged, and milled as in Example 1, and produced a relatively homogeneous paste with about a 3.7:1 solids to water ratio and a specific gravity of about 2.6 gr./cu. cm. The paste was thixotropic and had a low yield point. Even in this case, where loose or free sulfur was used, there was no separation of the mixture components. The paste was seen as an excellent electrode paste, and was easily pressure roller pasted into similar type plaques, using the method and equipment of Example 1.

EXAMPLE 5

Similarly to Example 1, an electrode paste was prepared containing 1 gram Mapico Black, 99 grams Meramec coarse natural magnetite, 0.40 Natrosol 250HHR thickener and 25 grams deionized water, with no sulfur or Marasperse N22 Dispersant. The paste was blended, aged, and milled as in Example 1, and produced a homogeneous paste with about a 4.0:1 solids to water ratio and a specific gravity of about 2.75 gr./cu. cm. The paste was relatively thixotropic and had a low yield point. It was a very inexpensive paste using substantially no expensive synthetic fine magnetite. There was no separation of the mixture components. The paste was seen as an excellent electrode paste which could be easily pressure roller pasted into similar type plaques, using the method and equipment of Example 1. The iron oxide material of this Example could, after pasting in a plaque, be easily activated by dipping the plate in a suitable sulfur containing liquid composition.

EXAMPLE 6

Similarly to Example 1, an electrode paste was prepared containing 0.1 grams on a solid basis of a water-soluble ammonium salt of a polyelectrolyte (believed to be an ammonium salt of a polyacrylic polyelectrolyte sold commercially by W. R. Grace & Co., under the Tradename Darvan C Dispersant) 7.5 grams Mapico Black, 92.5 grams Meramec coarse natural magnetite, 0.2 grams Natrosol 250HHR thickener and 28 grams deionized water. The paste was blended, aged, and milled as in Example 1, and produced a very good homogeneous paste with about a 3.6:1 solids to water ratio and a specific gravity of about 2.64 gr/cu. cm.

EXAMPLE 7

Similarly to Example 1, an electrode paste was prepared containing 0.1 grams on a solid basis of Darvan C Dispersant, 7.5 grams Mapico Black, 92.5 grams Meramec coarse natural magnetite, 0.28 grams Natrosol 250HHR thickener and 33.5 grams deionized water. The paste was blended, aged, and milled as in Example 1, and produced a very good homogeneous paste that was easily pressure roller pasted into expansible nickel fiber plaques. The paste had a 3:1 solids to water ratio and a specific gravity of about 2.47 gr./cu. cm.

EXAMPLE 8

Similarly to Example 1, an electrode paste was prepared containing 0.1 grams on a solid basis of Darvan C Dispersant, 7.5 grams Mapico Black, 92.5 grams Meramec coarse natural magnetite, 0.2 gram of an anionic water-soluble, sodium carboxy methyl ether of cellulose thickener (sold commercially by Hercules Inc. under the Tradename Cellulose Gum CMC) and 28 grams deionized water. The paste was blended, aged, and milled as in Example 1, and produced a stiff but very good homogeneous paste that was easily pressure roller pasted into expansible nickel fiber plaques. The paste had a 3.6:1 solids to water ratio and a specific gravity of about 2.64 gr/cu. cm.

EXAMPLE 9

Similarly to Example 1, an electrode paste was prepared containing 0.1 gram on a solid basis Darvan C Dispersant, 7.5 grams Mapico Black, 92.5 grams Meramec coarse natural magnetite, 0.28 gram Cellulose Gum CMC and 33.5 grams deionized water. The paste was blended, aged and milled as in Example 1, and produced a homogeneous paste with about a 3:1 solids to water ratio and a specific gravity of about 2.47 gr/cu. cm.

EXAMPLE 10

Similarly to Example 1, an electrode paste was prepared containing 0.15 gram on a solid basis of Darvan C Dispersant, 30 grams sulfur fuse coated Mapico Black, 70 grams sulfur fuse coated Meramec coarse natural magnetite, 0.02 grams Natrosol 250HHR and 28 grams deionized water. The total iron active material contained about 3 weight percent elemental sulfur based on solid component weight. The paste was blended, aged and milled as in Example 1, and produced a homogeneous paste with about a 3.6:1 solids to water ratio and a specific gravity of about 2.64 gr./cu. cm.

EXAMPLE 11

Similarly to Example 1, an electrode paste was prepared containing 0.125 grams on a solid basis of a water-soluble sodium salt of a carboxylated polyelectrolyte (believed to be a sodium salt of a polyacrylic polyelectrolyte sold commercially by W. R. Grace & Co., under the Tradename Darvan 7 Dispersant), 30 grams sulfur fuse coated Mapico Black, 70 grams sulfur fuse coated Meramec coarse natural magnetite, 0.02 grams Natrosol 250HHR and 28 grams deionized water. The total iron active material contained about 3 weight percent elemental sulfur based on solid component weight. The paste was blended, aged and milled as in Example 1, and produced a homogeneous paste with about a 3.6:1 solids to water ratio and a specific gravity of about 2.64 gr./cu. cm.

EXAMPLE 12

Similarly to Example 1, an electrode paste was prepared containing 0.65 grams solids of a sodium salt of a polymerized alkyl naphthalene sulfonic acid (sold commercially by W. R. Grace & Co. under the Tradename Darvan 6 Dispersant), 30 grams sulfur fuse coated Mapico Black, 70 grams sulfur fuse coated Meramec coarse natural magnetite, 0.02 grams Natrosol 250HHR and 28 grams deionized water. The total iron active material contained about 3 weight percent elemental sulfur based on solid component weight. The paste was blended, aged and milled as in Example 1, and produced a relatively homogeneous paste with about a 3.6:1 solids to water ratio and a specific gravity of about 2.64 gr./cu. cm.

I claim:
1. A negative electrode containing an active battery electrode paste mixture comprising:
   A. a solid component comprising:
   1. about 70-100 parts of coarse iron particles selected from the group consisting of iron oxide, iron oxide hydrate and mixtures thereof, having an average particle size of between about 5 to about 85 microns diameter;
   2. about 5-30 parts of fine iron particles selected from the group consisting of iron oxide, iron oxide hydrate and mixtures thereof having an average particle size of up to about 1 micron diameter;
   3. about 1-5 parts of a reaction promoting additive selected from the group consisting of sulfur, selenium, tellurium and their compounds;
   4. about 0.02-1 parts of a water-soluble dispersing agent; and
   5. about 0.02-0.5 parts of a water-soluble cellulosic thickener;
   B. water, wherein the solids:water weight ratio is between about 5:1 to 2:1 and the specific gravity of the paste is between about 2-3 grams/cu. cm.

2. The active material battery electrode of claim 1 wherein the dispersing agent is selected from the group of dispersants consisting of sodium lignosulfonate, sodium salts of polyelectrolytes, ammonium salts of polyelectrolytes and sodium salts of polymerized alkyl-aryl sulfonic acids and the cellulosic thickener is a cellulose ether.

3. The active material battery electrode of claim 1 wherein the fine iron particle component has an average particle size between about 0.1-1 micron diameter.

4. The active material battery electrode of claim 3 wherein the cellulosic thickener is a cellulose ether selected from the group consisting of hydroxyethyl ether cellulose, hydroxypropyl ether cellulose and sodium carboxy methyl cellulose, the dispersant is a sodium lignosulfonate, and the paste is milled and will pass through a No. 200 mesh, 76 micron U.S. Sieve Series screen.

5. The active material battery electrode of claim 4 wherein the iron particles have a mechanically fused coating of reaction promoting additive thereon.

6. The active material battery electrode of claim 4 wherein the reaction promoting additive is sulfur.

7. The active material battery electrode of claim 4 having a structure comprising a supporting 75-96 percent porous diffusion bonded metal fiber plaque, wherein the metal fibers are selected from the group consisting of nickel, nickel plated iron and nickel plated steel.

* * * * *